May 29, 1962 K. C. MOSIER 3,036,589
AIR VALVE

Filed July 23, 1958 2 Sheets-Sheet 1

INVENTOR.
KENNETH C. MOSIER
BY
ATTORNEY

May 29, 1962  K. C. MOSIER  3,036,589
AIR VALVE

Filed July 23, 1958  2 Sheets-Sheet 2

*INVENTOR.*
KENNETH C. MOSIER
BY
ATTORNEY

United States Patent Office 3,036,589
Patented May 29, 1962

3,036,589
AIR VALVE
Kenneth C. Mosier, 134 Avon Way, Dayton 9, Ohio
Filed July 23, 1958, Ser. No. 750,459
7 Claims. (Cl. 137—270)

My invention has reference to air valves in general and more specifically to compressed air control valves.

The popularity of compressed air as a control and power medium in modern industry has led to the development of a substantial number of generally satisfactory air control valves. While many of these valves are capable of reliable operation over extended periods of time, they are ordinarily characterized by substantial cost and occupy considerably more space than is usually considered desirable by machine designers. In addition they must normally be procured either as normally open or normally closed valves and cannot be readily converted from one form to the other without either special tools or a change in the identification of the ports. Furthermore, service of these valves is frequently difficult and often requires the use of special tools not always conveniently available when needed. In some instances the complex configuration of the valves makes difficult fabrication of the valve from corrosion resistant materials.

An important object of this invention is the provision of a compact, inexpensive air valve utilizing a cartridge insert readily sealed in a valve body and including a spherical valve member pivoted about a fixed axis for actuation by a toggle, solenoid or push button as desired.

Other primary objectives of this invention include the provision of a valve structure of the type described which may be easily serviced in the field with standard hand tools, which may be assembled to provide either a normally open or a normally closed valve without changing location of either the inlet or the outlet ports, which utilizes an exceptionally compact and efficient solenoid actuation device and which may be easily fabricated at low cost from corrosion resistant materials.

Several additional objectives and advantages of my invention will become apparent from the following detailed description and from the appended drawings in which.

Figure 1:
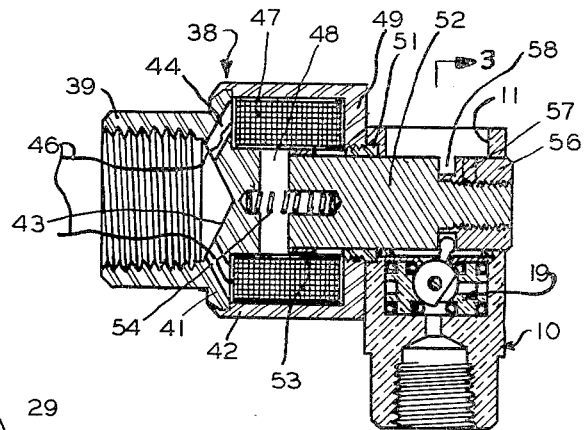
FIGURE 1 is a sectional view of my air valve arranged for solenoid actuation.
Figure 3:
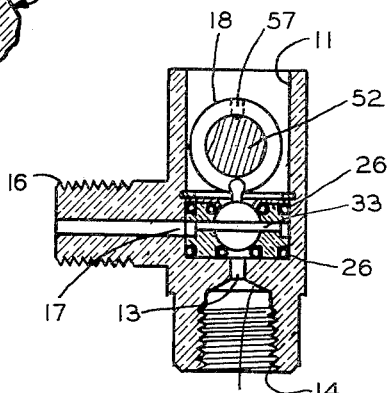
FIGURE 3 is a sectional view taken along the lines 3—3 of FIGURE 1.

My air valve utilizes a body, generally designated 10, having a cylindrical axially disposed bore 11 which also serves as an outlet port and which is closed by an end wall 12. An inlet orifice 13, coaxial with the bore 11, extends through the end wall and into a threaded nipple 14 formed integral with the body 10. A cylinder nipple 16 extends from the body 10 transversely to the bore 11 and defines a cylinder orifice 17 intercepting the bore 11 a short distance above the end wall 12 as seen in FIGURE 3. In the form shown in FIGURES 1 and 3 an actuator opening 18 is also formed in the body 10 above the cylinder nipple 16 and at 90° thereto in horizontal plane. This opening 18 intercepts the bore 11 and extends through the body 10 as indicated in FIGURE 1.

A cartridge, generally designated 19, is inserted in the bore 11 and is generally cylindrical in form. A snap ring 21 is received in a corresponding groove formed in the body 10 and serves to maintain the cartridge 19 in position. The cartridge 19 includes external parallel upper and lower flanges 22 and 23 respectively, spaced axially along the outer surface of the cartridge 19 and defining a centrally disposed cylinder groove 24 which registers with the cylinder orifice 17 when the cartridge 19 is in position in the bore. Upper and lower outer O-rings 26, of a rubber or similar resilient material, are placed over the cartridge 19 in contact with the upper and lower flanges 22 and 23 in such manner as to bear against the body 10 when the cartridge is in position, thereby sealing these areas against the passage of air. A cylinder port 27 extends transversely through the cartridge 19 connecting the cylinder groove 24 with a central bore indicated at 28. The central bore 28 is counterbored on the upper and lower face defining grooves in which upper and lower inner O-rings 29 and 31 respectively are disposed. The upper portion of the central bore 28 is cylindrical and terminates near its lower extremity in a spherical valve seat adapted to receive and support a ball valve 32. A pivot pin 33 extends through the cartridge 19 and through the ball 32 defining a pivot about which the ball may be rocked. A washer 34 having a centrally disposed opening and a downwardly extending inner flange is disposed across the upper surface of the cartridge 19 engaging the O-rings 26 and 29, the ball 32 and the retaining ring 21 thus holding the assembly in place with the central opening 28 in alignment with the central orifice 13.

The ball 32 is formed with a truncated face 36 and an upwardly projecting actuating stud 37. The depth to which the truncated face 36 extends is such that when the ball 32 is rocked to the right as seen in FIGURE 1 by force against the stud 37 a passage is established between the inlet orifice 13 and the cylinder port 27, one wall of this passage being the truncated face 36 of the ball. In this position it will be seen that communication between the cylinder port 27 and the outlet 11 is blocked by the upper inner O-ring 29 which engages the spherical surface of the ball 32. When the ball 32 is moved in the opposite direction about the pivot pin 33, as by movement of the stud 37 to the left as seen in FIGURE 1, the communication between the inlet port 13 and the cylinder port 27 is blocked by engagement of the ball 32 with the lower inner O-ring 31. However, in this position communication is established between the cylinder port 27 and the outlet or cylindrical bore 11. From the foregoing it will be noted that merely reversing the position of the cartridge 19 in the bore 11 changes the valve from a normally open to a normally closed valve without changing the identity of the inlet, outlet or cylinder ports. Ordinarily, the face 36 of the ball 32 will be flat, but when necessary, it may be somewhat concave or conical provided the periphery of the cone or indentation lies in a plane parallel to the pivot pin 33.

Figure 2:
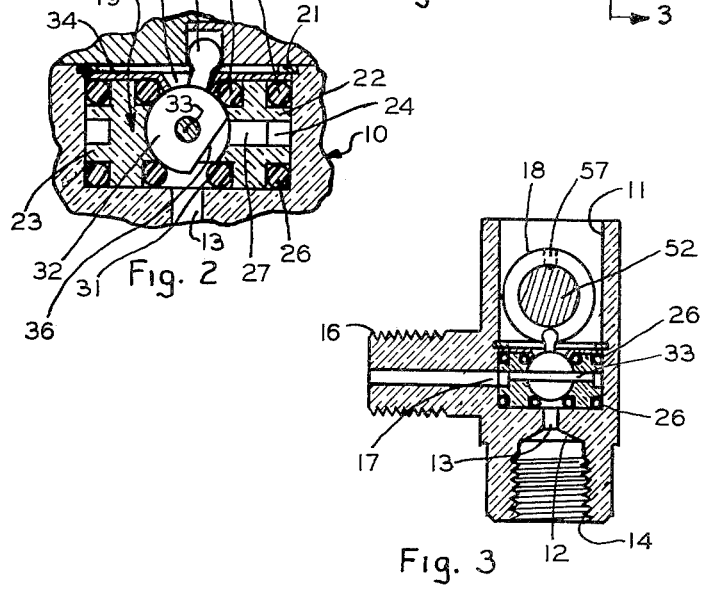
FIGURE 2 is an enlarged section through the cartridge of the valve illustrated in FIGURE 1.

It will be obvious that the operating mechanism may be any device suitable for moving the stud 37 in arcuate path from left to right as seen in FIGURE 2. In this particular instance a solenoid, generally designated 38, is utilized and is formed of a body 39 bored and threaded internally for mounting. The lower portion of the body 39 defines a flange 41 extending laterally into engagement with a shell 42 usually secured to the body 39 by spinning or other suitable means. The body 39 is closed by an end wall 43 in which openings 44 are formed for wires 46. A solenoid coil 47 is disposed within the shell 42 and defines a central opening 48. The shell 42 includes an inwardly extending lower flange 49 bored and tapped to receive a nipple 51 projecting from and secured to the body 10. A plunger 52 is reciprocally mounted in the nipple 51 and is guided in the bore 48 by a ring 53, preferably of brass, pressed on the end of the plunger 52. The inner ends of the end wall 43 and the plunger 52 are counterbored to receive a compression spring 54 which urges the plunger 52 to the right as seen in FIGURE 1. The outer end of the plunger 52 is turned and threaded to receive a collar 56 retained by set screw 57 and defining with the plunger a circumferential groove 58 which engages the stud 37 of the ball 32. The collar 56 is of the same diameter as the plunger 52 and is dimensioned for reciprocating movement in the body 10.

As current is passed through the coil 47, the magnetic field draws the plunger 52 into the solenoid thereby moving the plunger to the left and rocking the ball 32 about its pivot pin 33 in such manner as to connect the cylinder port 27 with the outlet 11. When the circuit through the coil 47 is broken, the spring 54 moves the plunger to the right, thereby rocking the ball 32 to the right and connecting the inlet port 13 with the cylinder port 27. Thus it will be seen that the cylinder port 27 is at all times in communication with the truncated face 36 of the ball 32 but is alternately connected with the inlet 13 or the outlet 11 depending on the position of the plunger 52.

Figure 4:
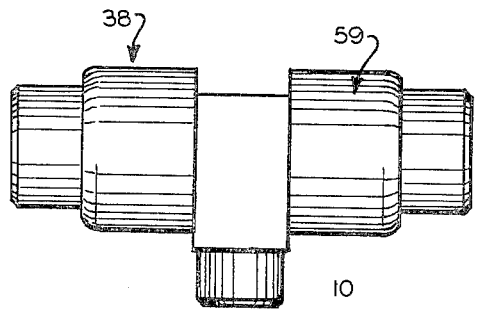
FIGURE 4 is a plan view of a double solenoid actuated air valve.
Figure 5:
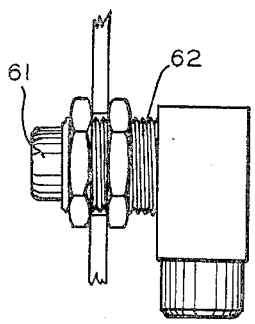
FIGURE 5 is an elevation of a push button actuated air valve.
Figure 6:
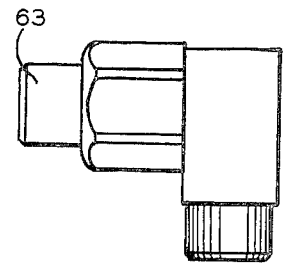
FIGURE 6 is an elevation of a cylinder actuated air valve.
Figure 7:
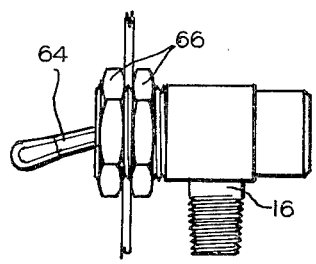
FIGURE 7 is a partial elevation of a toggle lever actuated air valve.

As indicated in FIGURE 4, the solenoid 38 may be supplemented by another solenoid 59 having a plunger secured to the plunger 52 in lieu of the collar 56 and the spring 54 omitted. If push button operation is desired, the device indicated in FIGURE 5 may be employed wherein a spring loaded plunger 61 may be mounted in a nipple 62 which replaces nipple 51. The plunger 61 will of course be of a design similar to the plunger 52 and engages the stud 37 in the ball 32 in similar manner. Alternatively, a cylinder may be utilized to actuate the plunger 52 rather than the solenoid 47. In such instances the cylinder would be mounted on a nipple 63 as indicated in FIGURE 6. A toggle switch 64 may also be utilized to actuate the stud 37. In this form of mounting the actuator opening 18 is eliminated and the upper end of the body 10 threaded to receive mounting nuts 66. The inner end of the toggle switch 64 is simply a fork member engaging the stud 37 on the ball 32.

From the foregoing descripiton it will be apparent that the several structures described may be easily formed even of noncorrosive materials such as stainless steel on conventional machine tools. Ordinarily, service of the valve consists of replacing the resilient sealing rings in an obvious and simple manner, although if desired an entire new cartridge 19 may be inserted in the body 10 without disturbing the inlet or cylinder connections. It should be noted that all necessary service operations may be readily performed by small conventional hand tools. Utilization of the brass ring 52 on the iron plunger 52 substantially enhances the resistance of the solenoid 38 to overheating even under rapid and continued operation. Cooling of the solenoid is also aided by the unique iron circuit employed and by disposing the plunger 52 in the path of exhaust air.

I claim:

1. In a valve having an inlet port, an exhaust port, and an intermediate port, a cartridge including upper and lower outer seal rings to seal the cartridge in a suitable bore in a valve, removable restraining means for holding the cartridge in a valve, said cartridge having a transverse bore adapted to communicate with the intermediate port of a valve and a central bore adapted to register with the inlet and defining a hemispherical valve seat, a pivot pin extending transversely across said central bore in the cartridge, a ball on the pivot pin engaging the hemispherical seat and truncated in a plane parallel to the pivot pin, upper and lower inner sealing rings on the cartridge engaging said ball, actuating means on the ball for rocking the ball from a first position to a second position, the outer periphery of the cartridge about a center line through the actuating means being symmetrical so that the cartridge may be inserted into a valve in one of two positions 180° apart.

2. In a three-way valve, a housing providing a cylindrical chamber having in its opposite ends inlet and outlet ports and having an orifice in its side wall, and a unitary valve cartridge having a central bore and having substantially the same external cylindrical size and shape as the chamber mounted in one position in the chamber and having inlet and outlet ports in its ends communicating with the corresponding chamber ports and having an orifice in its side wall communicating with the chamber orifice, a valve element of circular cross section, a pivot pin rotatably mounting said valve element in the bore of the cartridge for movement in one direction from a normally open position in which the inlet ports of the chamber and cartridge communicate with the orifices to another position in which said inlet ports are closed from the orifices and being reversible for mounting in the chamber in another position 180° displaced from said named position whereby movement of the valve element in the same direction will move said element from a normally closed position in which the orifices are closed from the outlet ports to another position in which the orifices are open to the outlet ports.

3. The valve structure claimed in claim 2 in which the valve element is provided with a radially projecting actuating stud extending at the same angle from one end of the cartridge in both of the mounted positions of the cartridge in the chamber.

4. The valve structure claimed in claim 2 in which the valve element is provided with a radially projecting actuating stud extending at the same angle from one end of the cartridge in both of the mounted positions of the cartridge in the chamber and in which the housing is provided with reciprocable operating means engaged with said stud and movable in the same direction to actuate the valve element from its normal position in each of the two mounted positions of the cartridge in the chamber.

5. The valve structure claimed in claim 2 in which the valve element is a ball formed with a truncated face constituting a passageway connected with the orifices and movable into and out of communication with the inlet ports in said one position of the cartridge in the chamber and movable into and out of communication with the outlet ports in said other position of the cartridge in the chamber.

6. The valve structure claimed in claim 2 in which the valve element is pivoted in the cartridge for rotation on an axis normal to the axis of the cartridge.

7. The valve structure claimed in claim 2 in which the valve element is a ball pivoted in the cartridge for rotation on an axis normal to the axis of the cartridge.

References Cited in the file of this patent

UNITED STATES PATENTS

| | | |
|---|---|---|
| 1,214,267 | Block | Jan. 30, 1917 |
| 2,063,699 | Schellin | Dec. 8, 1936 |
| 2,217,299 | Taylor | Oct. 8, 1940 |
| 2,578,396 | Brown | Dec. 11, 1951 |
| 2,613,908 | Palen | Oct. 14, 1952 |
| 2,628,809 | Mikeska | Feb. 17, 1953 |
| 2,868,498 | Kaiser | Jan. 13, 1959 |

FOREIGN PATENTS

| | | |
|---|---|---|
| 480,910 | Italy | May 16, 1953 |